United States Patent Office 2,919,316
Patented Dec. 29, 1959

2,919,316
SWITCHGEAR APPARATUS

Jack E. Schrameck, Pittsburgh, and Otto H. Soles, East Pittsburgh, Pa., assignors to Westinghouse Electric Corporation, East Pittsburgh, Pa., a corporation of Pennsylvania Application June 5, 1958, Serial No. 740,119

16 Claims. (Cl. 200—50)

This invention relates, generally, to switch-gear apparatus and, more particularly, to grounding switches for utilization with circuit breakers.

Electric power distribution in large metropolitan areas is frequently through cables interconnected in a ring bus system. The cables have a relatively high capacitance. Power transformers connected in the system have inductance. When circuit breakers in such a system are opened, dangerously high voltages may appear across the breaker terminals due to resonance between the transformer inductance and the cable capacitance. Such voltages have occurred on at least one large metropolitan distribution system. The high voltages appear because both ends of the section of the distribution circuit being isolated cannot be opened simultaneously and power required for resonance is supplied through the unopened end.

The rise in voltage may be prevented by applying a limited short circuit to the cable before opening one end of the section and then using the resulting short circuit current for tripping the breaker at the other end of the section. This has been done previously on distribution circuits where the opening time of the circuit breakers was eight cycles. Grounding devices having electropneumatic mechanisms were sufficiently fast in operation that a limited fault could be applied before separation of the breaker contacts after a tripping impulse was received.

However, the grounding device utilized previously is too slow for utilization with the high speed breakers now being built. Furthermore, it is desirable to have a device more positive and dependable in operation than the prior electro-pneumatic coupling between the breaker and the grounding device.

An object of the invention is to provide a grounding device which is mechanically coupled to a circuit breaker and is operable within three cycles.

A further object of the invention is to control the operation of the contact members of a grounding device in definite sequence relative to position and timing of the contact members of its associated circuit breaker.

Another object of the invention is to provide a grounding device in which the sequence of operation of its contact members is mechanically controlled.

Other objects of the invention will be explained fully hereinafter or will be apparent to those skilled in the art.

In accordance with one embodiment of the invention, the actuating mechanism for a grounding switch is driven by the operating mechanism for a circuit breaker with which the grounding switch is associated. The contact members of the grounding switch are open when the breaker is closed and in service. When the breaker is tripped the grounding switch is closed before the breaker contacts are opened and the grounding switch remains closed while the breaker is open. When the breaker begins to close, the contacts of the grounding switch are opened before the breaker contacts are closed or within arcing distance.

For a better understanding of the nature and objects of the invention, reference may be had to the following detailed description, taken in conjunction with the accompanying drawings, in which.

Figure 1:
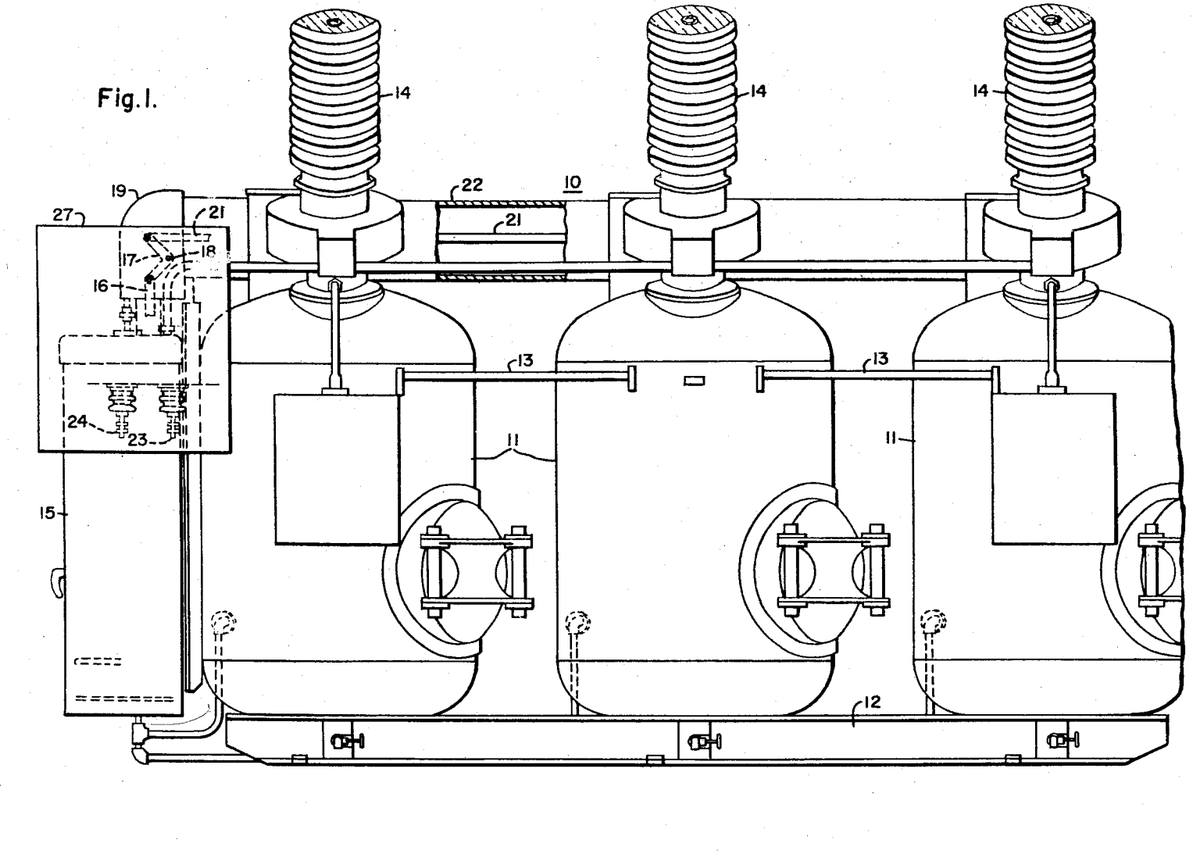
Figure 1 is a view, in side elevation, of a circuit breaker structure having grounding switches associated therewith which embody the principal features of the invention.
Figure 2:
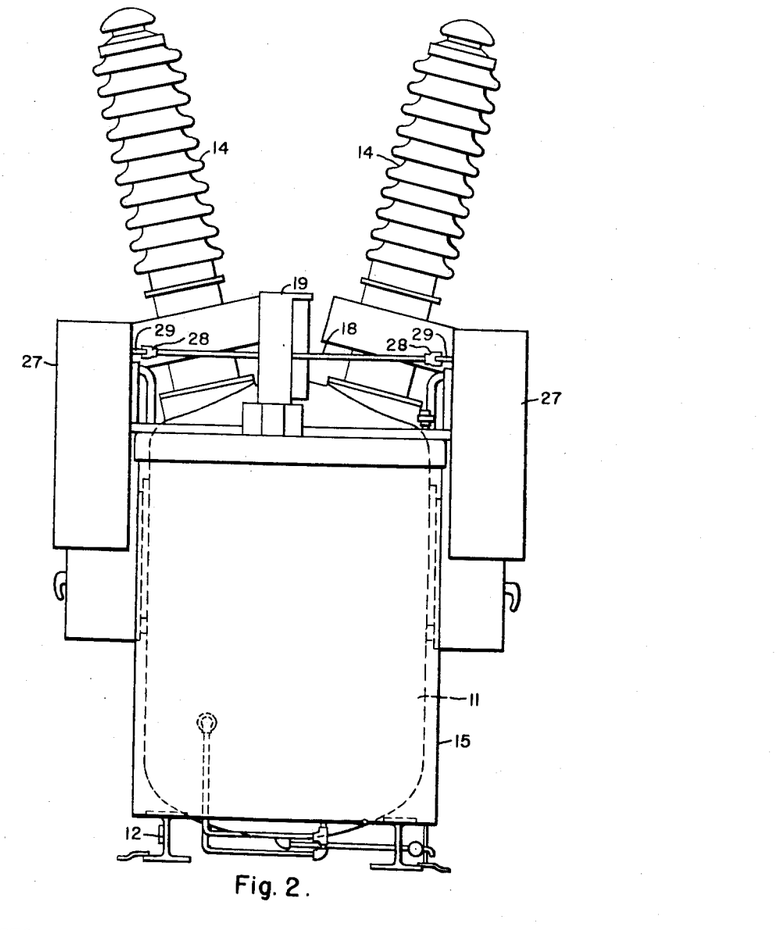
Fig. 2 is a view, in end elevation, of the structure shown in Fig. 1.

Referring to the drawings, and particularly to Fig. 1, the reference numeral 10 designates generally a three-phase circuit interrupter which may be of the compressed gas type, such as the interrupter described in a copending application of B. P. Baker, Serial No. 590,066, filed June 7, 1956. It will be understood that the present invention may be utilized with circuit interrupters of other types as well as the interrupter herein illustrated. As shown, the interrupter includes three metal tanks 11, there being one tank for each pole of the interrupter. The tanks 11 are mounted upon a metal base 12. The three tanks are tied together by means of tie rods 13. As shown in Fig. 2, each tank is provided with two terminal bushings 14 which may be of the type disclosed in the Baker application.

As described in the aforesaid copending application, a pneumatic mechanism, which is enclosed in a housing 15, is provided for operating the contact members of the circuit interrupter. The pneumatic mechanism is connected by means of a link 16 to one arm of a bell crank lever 17 which may be secured to a shaft 18 rotatably mounted in a housing 19. The other arm of the bell crank lever 17 is connected to an operating rod 21 which is horizontally disposed in a housing 22. The operating rod 21 is connected to the contact members of the three poles of the circuit interrupter, thereby actuating the contact members for all three poles simultaneously. Thus, the bell crank lever 17 moves with the contact members during opening and closing of the contact members. The lever 17 is secured to the shaft 18, thereby rotating the shaft. The shaft 18 is utilized for a purpose which will be described more fully hereinafter.

As explained hereinbefore, it is desirable to provide for grounding certain portions of a power distribution system in order to prevent an excessive voltage being developed during certain switching operations. The grounding may be done by means of two grounding switches which connect two terminals of a delta-connected grounding transformer to ground when the grounding switches are closed. The third terminal of the grounding transformer may be permanently connected to ground.

As also explained hereinbefore, prior grounding switches were not sufficiently fast in their closing operation to be utilized with modern high speed circuit breakers. Furthermore, the prior grounding switches which were operated by separate mechanisms were not entirely positive and dependable in their operation.

In order to provide a grounding switch which is capable of closing within three cycles and is positive in operation, the present switch is operated directly by the operating mechanism of the circuit interrupter. The contact members of the switch are so arranged and the sequence of operation is such that the grounding device is open when the contact members of the circuit breaker are closed. When the circuit breaker is tripped, the grounding device is closed prior to the opening of the contact members of the breaker. The grounding device remains closed while the breaker is open. During the closing operation of the circuit breaker, the grounding switch is opened before the contact members of the circuit breaker are closed or before they come within arcing distance prior to their actual closing. Thus, the contact members of the grounding switch are closed at one point of the breaker opening stroke and the contact members of the grounding switch are opened at another point in the breaker closing stroke.

Figure 3:
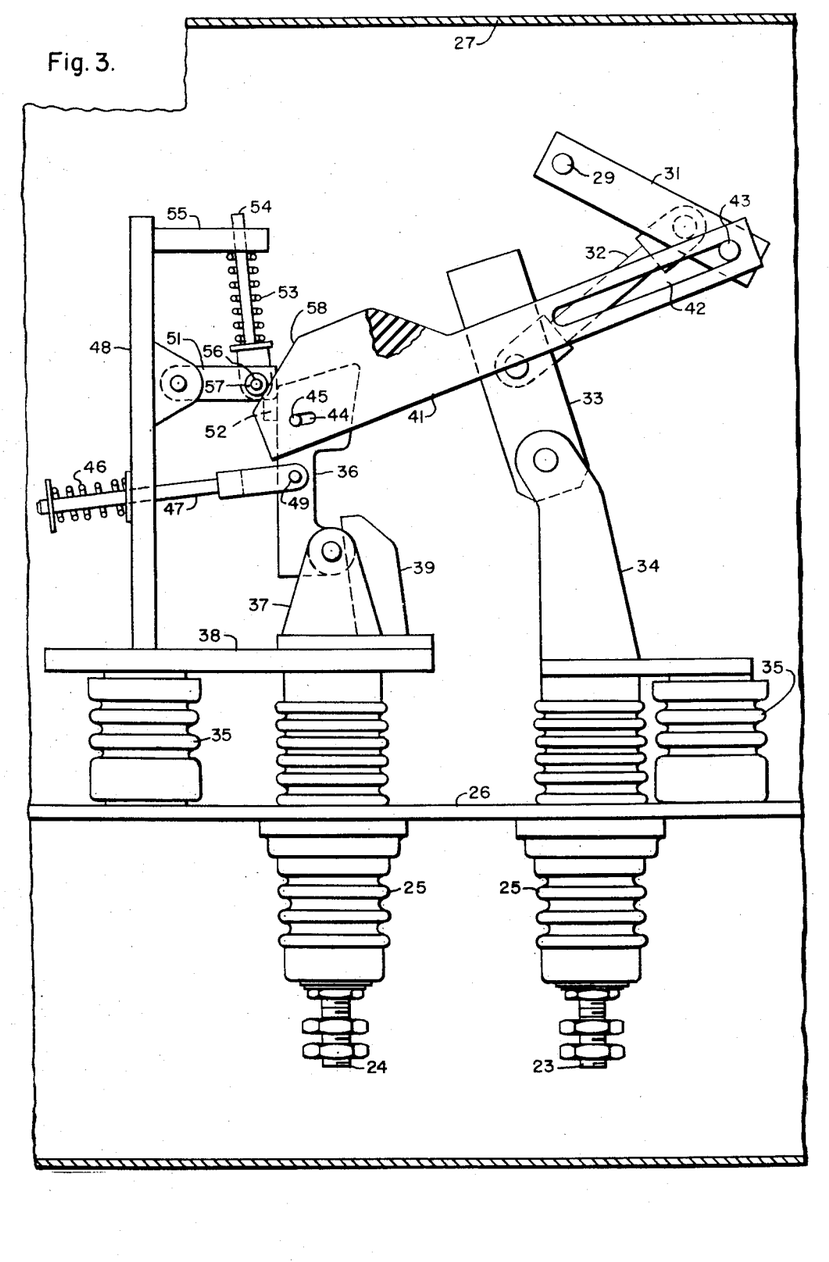
Fig. 3 is an enlarged view, partly in section and partly in elevation, of one of the grounding switches, the contact members of the switch being open.

The grounding switch shown in Fig. 3 comprises two terminals 23 and 24 each of which extends through an insulating bushing 25 mounted on a supporting member 26 inside a metal housing 27. As shown in Fig. 2, there are two grounding devices provided with the circuit breaker 10. As explained hereinbefore, one of the grounding devices may be connected to one terminal of a delta-connected grounding transformer and the other grounding device may be connected to another terminal of the transformer. The two devices are similar in construction.

As also shown in Fig. 2, one end of the shaft 18 is connected by means of a coupling 28 to a shaft 29 which is rotatably mounted in one of the housings 27. The other end of the shaft 18 is connected in a similar manner to another shaft 29 in the other housing 27.

As shown in Fig. 3, an operating arm 31 is driven by the shaft 29. A link 32 connects the arm 31 to a switch blade 33 which is hinged on a hinge jaw 34 supported by one of the bushings 25 and an additional insulator 35 mounted on the supporting member 26 in the housing 27. The hinge jaw 34 is electrically connected to the terminal 23. A hinged contact member 36 is supported by a hinge jaw 37 which, in turn, is mounted upon a base 38. The base 38 is supported by the other bushing 25 and another insulator 35. The base 38 is electrically connected to the terminal 24. A fixed contact member 39 is also mounted upon the base 38 and is therefore electrically connected to the terminal 24.

The hinged contact member 36 is connected to the arm 31 through a lost-motion connection comprising a lever 41 composed of insulating material and having a slot 42 therein in which a pin 43 is disposed. The pin 43 is secured to the arm 31. A shorter slot 44 is provided near the other end of the lever 41 and a pin 45, which is secured to the hinged contact member 36, is disposed in the slot 44. A compression spring 46 is mounted upon a rod 47 which extends through a support 48 and is connected to the contact member 36 by means of a pin 49. The spring 46 is disposed to bias the hinged contact member 36 toward the support 48.

When the members of the switch are in the positions shown in Fig. 3, movement of the contact member 36 toward the support 48 is prevented by a pivotally mounted stop member 51 which is disposed to engage one corner of the hinged contact member 36. The stop 51 is biased against a projection 52 on the bottom of the contact member 36 by means of a spring 53 mounted on a rod 54 which extends through a bracket 55 on the support 48. The one end of the rod 53 is connected to the stop 51 by means of a pin 56. A roller 57 is also mounted on the pin 56. The roller 57 engages a sloping surface 58 on the lever 41.

When the arm 31 is driven in a clockwise direction by the shaft 29, the hinged blade 33 is moved to engage the hinged contact member 36. This operation takes place during the initial movement of the circuit breaker contacts toward their open position and the blade 33 engages the contact member 36 prior to the opening of the circuit breaker contacts. As the arm 31 continues in a clockwise direction, the blade 33 is disengaged from the hinged contact member 36 and engages the fixed contact member 39. Furthermore, as the pin 43 moves to the bottom of the slot 42, the lever 41 is actuated about the pin 45, which functions as a fulcrum for the lever, and the lever is moved lengthwise the distance permitted by the slot 44, thereby causing the surface 58 of the lever to force the stop 51 out of engagement with the hinged contact member 36. The spring 46 then moves the hinged contact member 36 out of the path of travel of the hinged switch blade 33. The members of the switch are now in the fully closed position as shown in Fig. 4.

Figure 4:
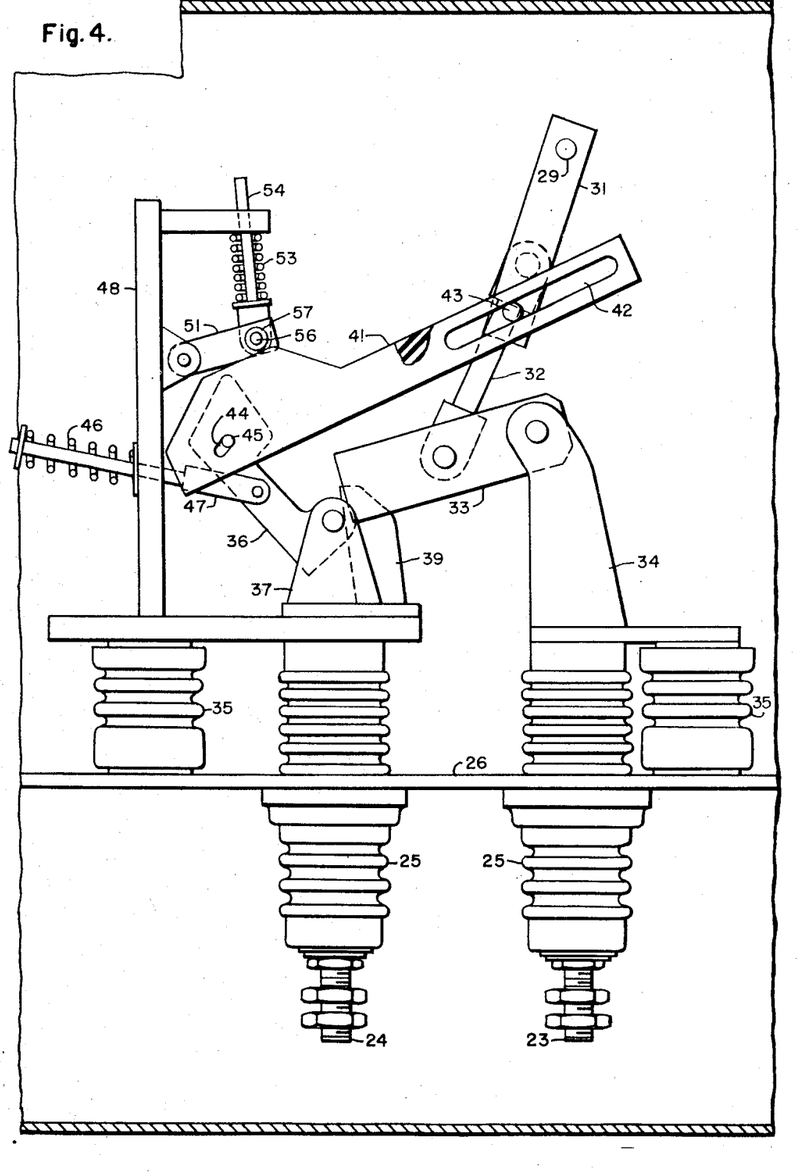
Fig. 4 is an enlarged view, similar to Fig. 3, showing the contact members of the switch closed.

During the initial closing movement of the main circuit breaker contacts, the arm 31 is rotated in a counter-clockwise direction from its position shown in Fig. 4 and the switch blade 33 is disengaged from the fixed contact member 39 prior to the closing of the main breaker contacts or their coming within arcing distance during the closing operation. As previously explained, the hinged contact member 36 has been moved out of the path of movement of the blade 33, therefore the blade 33 does not engage the hinged contact member 36 during the closing operation of the main breaker contacts.

When the pin 43 moves to the upper end of the slot 42, the lever 41 is actuated to return the hinged contact member 36 to the position shown in Fig. 3 where it is held by the stop member 51 as previously explained. However, as previously stated, the contact member 36 does not engage the blade 33 when the blade 33 is being returned to the position shown in Fig. 3.

Thus, the blade 33 makes contact with the contact member 36 before the main contact members of the circuit breaker are opened and the blade 33 breaks contact with the contact member 39 before the main contact members of the breaker are closed. In this manner, the grounding switch functions to ground a portion of the transmission system before the main contact members of the circuit breaker are opened, but the ground is removed prior to the reclosing of the circuit breaker contact members.

The modification of the invention shown in Figs. 5 to 8, may be utilized with a circuit breaker of the compressed air type or other breaker in which a compressed gas is available for utilization inside the housing for the grounding switch. By utilizing a compressed gas inside the grounding switch, the distance between open contact members of the switch may be relatively short in a relatively high voltage switch and the mechanical size of the contact members and other moving parts may be reduced since high voltage means less current for a given k.v.a. rating. The structure of the grounding switch is further simplified by utilizing a cam for actuating two sets of contact members which are operated sequentially. Thus, a switch is provided which has a relatively low mass and which can be operated at a high speed.

Figure 5:
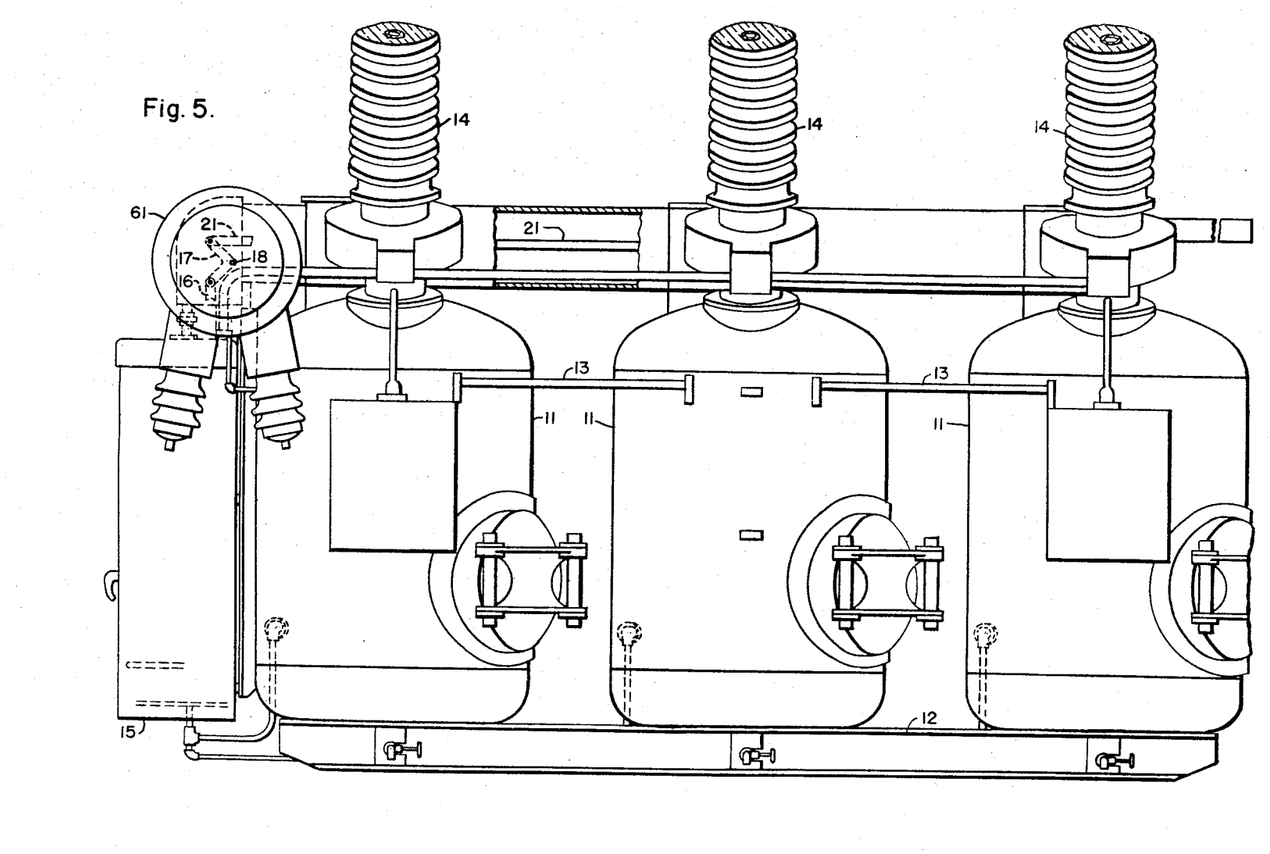
Fig. 5 is a view, in side elevation, of a circuit breaker structure having grounding switches of a modified type associated therewith.
Figure 6:
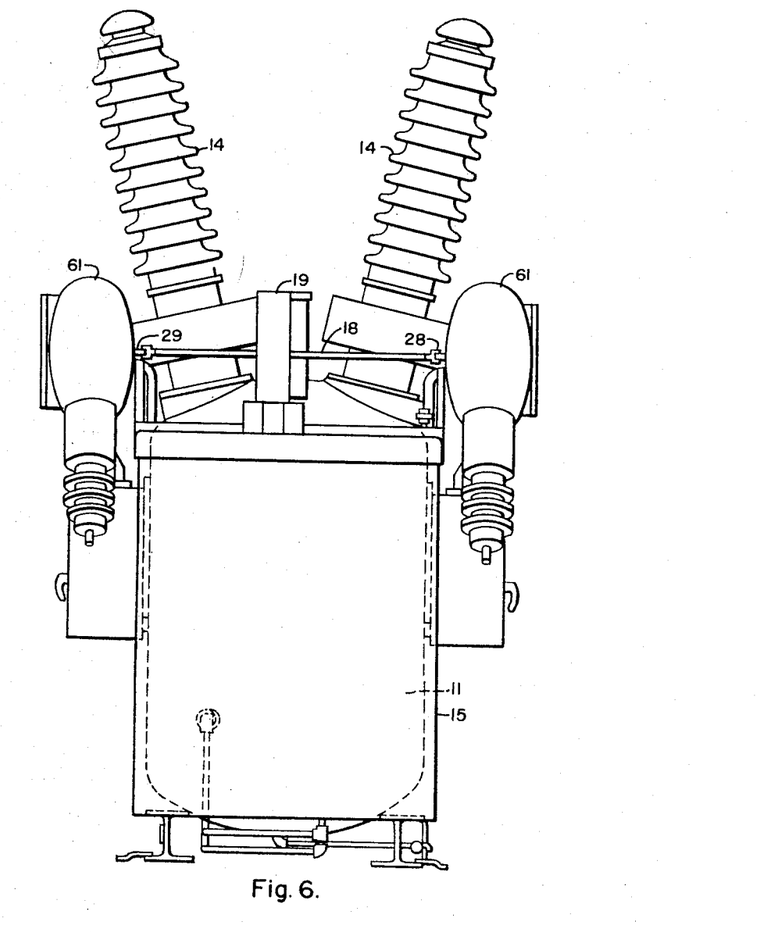
Fig. 6 is a view, in end elevation, of the structure shown in Fig. 5.

As shown in Figs. 5 and 6, two grounding switch housings 61 are so mounted on the circuit breaker structure that the shaft 18 which operates the circuit breaker contacts, also drives a shaft 29 in each one of the housings. The shaft 18 is rotated by the bell crank lever 17 of the circuit breaker operating mechanism in the manner hereinbefore described.

Figure 7:
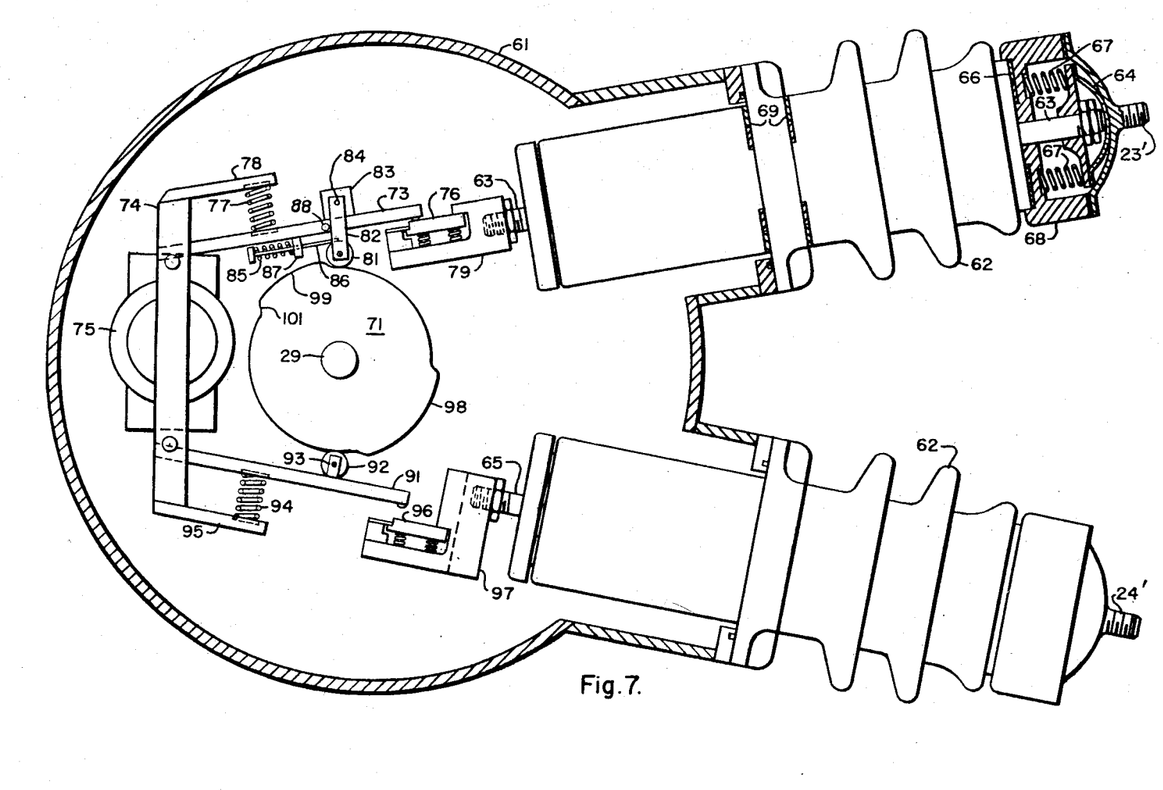
Fig. 7 is an enlarged view, partly in section and partly in elevation, of one of the modified grounding switches, the switch being rotated 90° from the position shown in Figs. 5 and 6.

As shown in Fig. 7, each housing 61 is provided with terminals 23' and 24' which may be connected in the power system in the manner previously described. The terminals 23' and 24' are mounted on insulating bushings 62. The terminal 23' is electrically connected to a conductor 63 by means of a spring 64. The conductor 63 extends through the bushing 62 into the housing 61. The terminal 24' is connected to a conductor 65 in a similar manner.

The compressed gas is prevented from escaping from the housing 61 by means of a gasket 66 which is compressed by springs 67 disposed inside a cap 68 on the bushing 62. Gaskets 69 are also provided to prevent gas from escaping around the bushing 62 where it is attached to the housing 61.

Figure 8:
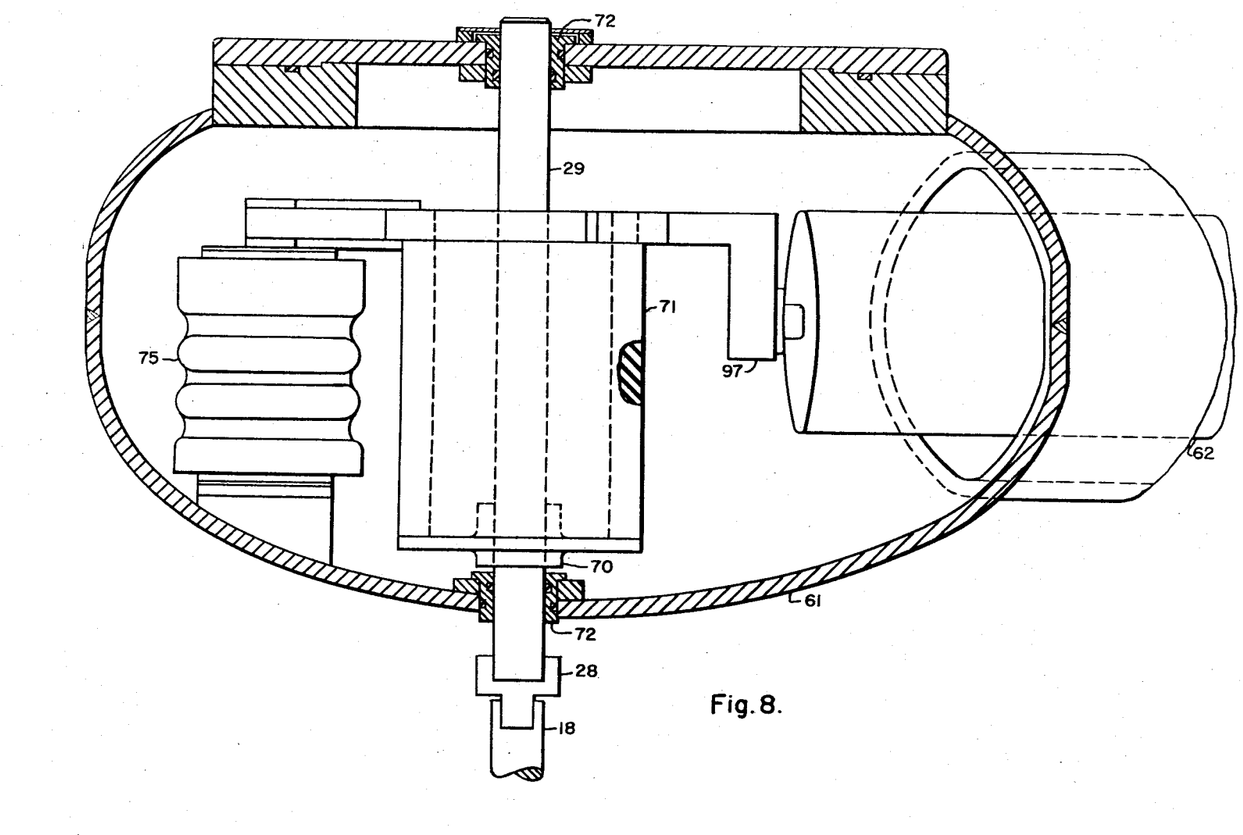
Fig. 8 is an enlarged view, partly in section and partly in plan, of the grounding switch shown in Fig. 7.

As shown in Fig. 8, a cam 71, which is composed of insulating material, is secured to the shaft 29 which is rotatably mounted in the housing 61. The cam 71 is generally cylindrical in shape with an external flange at an open end. The other end of the cylinder is closed and has a boss 70 which is secured to the shaft 29. The shaft 29 is driven by the shaft 18 through a coupling 28 in the manner previously described. Suitable bearing seals 72 are provided to prevent the compressed gas from escaping from the housing around the shaft 29.

As shown in Fig. 7, a contact arm 73 is pivotally mounted on a support 74 which is mounted on an insulator 75. The contact arm 73 is biased into engagement with a contact member 76 by means of a spring 77 which is disposed between the contact arm 73 and a bracket 78 on the support 74. The contact member 76 is mounted on a supporting member 79 and is electrically connected to the conductor 63. A spring-biased follower comprising a roller 81 and a pivoted lever 82 is provided for actuating the arm 73 against the pressure of the spring 77 under predetermined conditions as will be explained more fully hereinafter. The lever 82 is pivotally mounted on a bracket 83 by means of a pin 84. The bracket 83 is attached to the contact arm 73. A spring 85 is mounted on a rod 86 which extends through a bracket 87 on the contact arm 73 and is attached to the lever 82. The spring 85 is disposed to bias the lever 82 toward a stop pin 88 in the contact arm 73.

Another contact arm 91 is pivotally mounted on the support 74. A roller 92, which is mounted on a bracket 93, engages the cam 71. The bracket 93 is attached to the contact arm 91. The contact arm 91 is biased toward the cam 71 by means of a spring 94 disposed between the arm 91 and a bracket 95 on the support 74. A contact member 96 is mounted on a supporting member 97 and is electrically connected to the conductor 65. Thus, when the arm 73 engages the contact 76 and the arm 91 engages the contact 96 the two sets of contact members are connected in series-circuit relation through the support 74 to establish a circuit through the grounding switch.

In Fig. 7, the cam 71 and the contact members of the switch are shown in their respective positions when the contact members of the main circuit breaker are closed. During opening of the main circuit breaker, the cam 71 is rotated in a clockwise direction as viewed in Fig. 7. When the cam 71 rotates clockwise, a portion 98 of the cam engages the roller 92 to close the contact arm 91 against the contact member 96. This action takes place prior to the opening of the main contact members of the circuit breaker. The surface 98 remains in engagement with the roller 92 throughout the opening movement of the main circuit breaker contacts.

During the initial opening movement of the circuit breaker contacts, the arm 73 is not disengaged from the contact member 76 because the spring 85 permits the lever 82 to swing towards the right, as viewed in Fig. 7, thereby permitting the roller 81 to ride up on the raised surface 99 of the cam 71 without moving the arm 73. It will be understood that the spring 77 may be made stronger than the spring 85, thereby providing sufficient pressure on the arm 73 to maintain contact pressure on the contact member 76. Thus, the contact arm 73 continues to remain in engagement with the contact 76 after the arm 91 engages the contact 96, thereby completing the grounding circuit through the switch during the initial opening movement of the breaker contacts.

When the breaker contacts are fully open, the raised surface 99 has passed under the roller 81. The roller 81 is now in engagement with a shoulder 101 on the cam 71. Likewise, as previously stated, the roller 92 is still in engagement with the raised surface 98 of the cam 71. Thus, the contact members of the grounding switch are closed while the main contact members of the circuit breaker remain open.

During closing movement of the contact members of the circuit breaker the cam 71 is rotated in a counterclockwise direction. When the cam first starts to rotate counterclockwise, the roller 81 must ride up on the raised surface 99 since the pin 88 prevents the lever 82 from swinging towards the left as viewed in Fig. 7. Thus, the arm 73 is disengaged from the contact member 76 to interrupt the circuit through the grounding switch prior to the closing of the main breaker contacts or prior to their coming within arcing distance during the closing operation. When the main breaker contacts are fully closed the cam 71 and the contact members of the grounding switch are returned to their respective positions, shown in Fig. 7.

It will be noted that the contact members of the grounding switch are closed at one position of the cam and opened at another position of the cam. This provides a switch that will open and close at different intervals in the breaker operation. The switch will make contact before the breaker opens and will break contact before the breaker closes. In this manner, the grounding switch may be utilized to establish a ground for a limited time during switching operations, thereby preventing the development of excessive voltages on the power system.

From the foregoing description, it is apparent that the invention provides a grounding switch which is mechanically operated by the main circuit breaker operating mechanism, thereby providing positive and dependable operation. Furthermore, the opening and the closing of the grounding switch are completed in a relatively short time during the initial movement of the main breaker contact members. The necessary sequence of operation is obtained by means of the mechanism for operating the grounding switch.

Since numerous changes may be made in the above described construction, and different embodiments of the invention may be made without departing from the spirit and scope thereof, it is intended that all matter contained in the foregoing description or shown in the accompany drawing shall be interpreted as illustrative and not in a limiting sense.

We claim as our invention:

1. In a switchgear structure, in combination, a circuit breaker having openable and closable contact members, operating means for actuating said contact members, a grounding switch having contact members different from the contact members of the circuit breaker but actuated by said operating means, said grounding switch being normally open while the breaker is closed, and said grounding switch being closed prior to the opening of the breaker contact members and opened prior to the closing of said breaker contact members.

2. In a switchgear structure, in combination, a circuit breaker having openable and closeable contact members, a member on said breaker movable with said contact members, a grounding switch having contact members different from the contact members of the circuit breaker and normally open while the breaker is closed, and said grounding switch being closed by said member prior to the opening of the breaker contact members and opened prior to the closing of the breaker contact members.

3. In a switchgear structure, in combination, a circuit breaker having operable and closable contact members, a member on said breaker movable with said contact members, a grounding switch having contact members different from the contact members of the circuit breaker and normally open while the breaker is closed, operating means for said grounding switch actuated by said member, and said grounding switch being closed by said operating means prior to the opening of the breaker contact members and opened prior to the closing of the breaker contact members.

4. In a switchgear structure, in combination, a circuit breaker having openable and closable contact members, a member on said breaker movable with said contact members, a grounding switch having contact members different from the contact members of the circuit breaker and normally open while the breaker is closed, a shaft driven by said member, and said grounding switch being closed by said shaft prior to the opening of the breaker contact members and opened prior to the closing of the breaker contact members.

5. In a switchgear structure, in combination, a circuit breaker having openable and closable contact members, a member on said breaker movable with said contact members, a grounding switch having contact members different from the contact members of the circuit breaker and normally open while the breaker is closed, a shaft driven by said member, and said grounding switch being closed by said shaft prior to separation of the breaker contact members during opening of the breaker and opened before the breaker contact members move within arcing distance during closing of the breaker.

6. In a switchgear structure, in combination, a circuit breaker having openable and closable contact members, a lever movable with said contact members, a shaft driven by said lever, a grounding switch normally open while the breaker is closed, and linkage means actuated by said shaft to close the grounding switch prior to the opening of the breaker contact members and to open the grounding switch prior to the closing of the breaker contact members.

7. In a switchgear structure, in combination, a circuit breaker having openable and closable contact members, a lever movable with said contact members, a shaft driven by said lever, a grounding switch normally open while the breaker is closed, and cam means driven by said shaft for closing the grounding switch prior to the opening of the breaker contact members and for opening the grounding switch prior to the closing of the breaker contact members.

8. In a switchgear structure, in combination, a circuit breaker having openable and closable contact members, a lever movable with said contact members, a shaft driven by said lever, a grounding switch normally open while the breaker is closed, said grounding switch having a first contact member and a second contact member, and mechanical means actuated by said shaft to close said first contact member prior to the opening of the breaker contact members and to open said second contact member prior to the closing of the breaker contact members.

9. In a switchgear structure, in combination, a circuit breaker having openable and closable contact members, a lever movable with said contact members, a shaft driven by said lever, a grounding switch blade normally open while the breaker is closed, a hinged contact member and a fixed contact member connected to the same terminal, linkage means actuated by said shaft to engage the blade with the hinged contact member prior to the opening of the breaker contact members and with the fixed contact member after the breaker contact members are opened, and said blade being disengaged from the fixed contact member prior to the closing of the breaker contact members.

10. In a switchgear structure, in combination, a circuit breaker having openable and closable contact members, a lever movable with said contact members, a shaft driven by said lever, a grounding switch blade normally open while the breaker is closed, a hinged contact member and a fixed contact member connected to the same terminal, linkage means actuated by said shaft to engage the blade with the hinged contact member prior to the opening of the breaker contact members and with the fixed contact member after the breaker contact members are opened, and said blade being disengaged from the fixed contact member prior to the closing of the breaker contact members, and said hinged contact member being prevented from engaging said blade during closing of the breaker contact members.

11. In a switchgear structure, in combination, a circuit breaker having openable and closable contact members, a lever movable with said contact members, a shaft driven by said lever, a grounding switch having a first set of contact members normally open while the breaker is closed and a second set of contact members normally closed while the breaker is closed, said sets of contact members being connected in series-circuit relation, and cam means driven by said shaft for actuating said sets of contact members to establish a circuit through them before the breaker opens and to interrupt said circuit before the breaker closes.

12. In a switchgear structure, in combination, a circuit breaker having openable and closable contact members, a lever movable with said contact members, a shaft driven by said lever, a grounding switch having a first set of contact members normally open while the breaker is closed and a second set of contact members normally closed while the breaker is closed, said sets of contact members being connected in series-circuit relation, cam means driven by said shaft in one direction to close said first set of contact members to establish a circuit through them before the breaker opens, and said cam being driven by said shaft in the opposite direction to open said second set of contact members to interrupt the circuit through them before the breaker closes.

13. In a switchgear structure, in combination, a circuit breaker having openable and closable contact members, a lever movable with said contact members, a shaft driven by said lever, a grounding switch having a first set of contact members normally open while the breaker is closed and a second set of contact members normally closed while the breaker is closed, said sets of contact members being connected in series-circuit relation, a cam driven by said shaft, a spring-biased follower for said cam, said follower permitting the second set of contact members to remain closed while the cam rotates in one direction to close the first set of contact members to establish a circuit through them before the breaker opens, and said second set of contact members being opened when the cam rotates in the opposite direction to interrupt the circuit through them before the breaker closes.

14. A grounding switch comprising a rotatable shaft, an arm secured to said shaft, a hinged switch blade connected to one terminal of the switch, a link connecting said arm to said blade, a hinged contact member and a fixed contact member connected to another terminal of the switch, a lever connecting the hinged contact member to said arm with a lost-motion connection, said arm actuating said blade into engagement with the hinged contact member prior to engagement of the blade with the fixed contact member when moving in one direction, and said lever preventing the blade from engaging the hinged contact member when the blade is moving in the opposite direction.

15. An enclosed grounding switch comprising a casing, a rotatable shaft extending into the casing, a cam driven by said shaft, a spring-biased follower for the cam, a first set of contact members open when the cam is in a predetermined position, a second set of contact members closed when said cam is in said predetermined position, said sets of contact members being connected in series-circuit relation, said follower permitting the second set of contact members to remain closed while the cam rotates in one direction to close the first set of contact members to establish a circuit through them, and said second set of contact members being opened when the cam rotates in the opposite direction to interrupt the circuit through them.

16. An enclosed grounding switch comprising a casing having a compressed gas retained within the casing, a rotatable shaft extending into the casing, a bearing seal for the shaft, a cam driven by the shaft inside the casing, a first set of contact members open when the cam is in a predetermined position, a second set of contact members closed when said cam is in said predetermined position, said sets of contact members being connected in series-circuit relation, said second set of contact members remaining closed while the cam rotates in one direction to close the first set of contact members to establish a circuit through them, said second set of contact members being opened when the cam rotates in the opposite direction to interrupt the circuit through them, and said gas reducing arcing between the open contact members.

References Cited in the file of this patent

UNITED STATES PATENTS

| | | |
|---|---|---|
| 2,358,146 | Clute | Sept. 12, 1944 |
| 2,364,252 | Thieme | Dec. 5, 1944 |
| 2,392,201 | Thumim et al. | Jan. 1, 1946 |